United States Patent
Felix-Henry et al.

(10) Patent No.: US 9,400,067 B2
(45) Date of Patent: Jul. 26, 2016

(54) FLEXIBLE TUBULAR UNDERWATER PIPE FOR GREAT DEPTHS, AND METHOD FOR MANUFACTURING SAME

(75) Inventors: Antoine Felix-Henry, Rouen (FR); Pascal Estrier, Saint-Wandrille-Rançon (FR)

(73) Assignee: TECHNIP FRANCE (FR)

( * ) Notice: Subject to any disclaimer, the term of this patent is extended or adjusted under 35 U.S.C. 154(b) by 294 days.

(21) Appl. No.: 14/006,850

(22) PCT Filed: Mar. 29, 2012

(86) PCT No.: PCT/FR2012/050662
§ 371 (c)(1),
(2), (4) Date: Dec. 3, 2013

(87) PCT Pub. No.: WO2012/131260
PCT Pub. Date: Oct. 4, 2012

(65) Prior Publication Data
US 2014/0076451 A1    Mar. 20, 2014

(30) Foreign Application Priority Data
Mar. 29, 2011    (FR) .................................. 11 52609

(51) Int. Cl.
*F16L 11/10*    (2006.01)
*F16L 11/08*    (2006.01)
(Continued)

(52) U.S. Cl.
CPC ............. *F16L 11/10* (2013.01); *B29C 53/8016* (2013.01); *F16L 11/08* (2013.01); *F16L 11/083* (2013.01); *B29C 53/582* (2013.01); *B29C 53/70* (2013.01); *B29C 2053/8025* (2013.01)

(58) Field of Classification Search
USPC .............................. 138/130, 129, 135, DIG. 5
See application file for complete search history.

(56) References Cited

U.S. PATENT DOCUMENTS 4,019,539 A  *  4/1977  Hoffmann ................ F16L 58/16
                                                     138/118
4,403,631 A  *  9/1983  Abdullaev .............. F16L 11/16
                                                     138/130

(Continued)

FOREIGN PATENT DOCUMENTS

FR          2 926 347          7/2009
WO      WO 03/083343 A1      10/2003
WO     WO 2008/135663 A1     11/2008

OTHER PUBLICATIONS

International Search Report and Written Opinion dated May 29, 2012 issued in corresponding International Patent Application No. PCT/FR2012/050662.

*Primary Examiner* — James Hook
(74) *Attorney, Agent, or Firm* — Ostrolenk Faber LLP

(57) ABSTRACT

A method for manufacturing a flexible tubular underwater pipe (10): A leakproof tubular structure (12, 14, 16) is covered with at least one layer (18, 20) of armor wires. At least one continuous longitudinal element made of a deformable material is wound in a helix with short pitch around the layer (18, 20) of armor wires to form a holding layer 24. The at least one longitudinal element is wound under longitudinal tension $T_0$ so as to stretch its deformable material according to a relative elongation corresponding to a tensile stress $\sigma_0$ less than the elastic limit value $\sigma_E$ of the deformable material, and the elastic limit value $\sigma_E$ corresponds to a tensile stress beyond which the deformation of the material is irreversible.

13 Claims, 2 Drawing Sheets

(51) Int. Cl.
*B29C 53/80* (2006.01)
*B29C 53/58* (2006.01)
*B29C 53/70* (2006.01)

(56) References Cited

U.S. PATENT DOCUMENTS

| | | | | |
|---|---|---|---|---|
| 4,850,395 A | * | 7/1989 | Briggs | F16L 11/083 138/124 |
| 6,085,798 A | * | 7/2000 | Le Nouveau | F16L 11/081 138/125 |
| 6,415,825 B1 | * | 7/2002 | Dupoiron | F16L 11/083 138/127 |
| 2001/0003992 A1 | * | 6/2001 | Espinasse | F16L 11/08 138/135 |
| 2003/0102044 A1 | * | 6/2003 | Coutarel | F16L 11/16 138/130 |
| 2003/0155029 A1 | * | 8/2003 | Glejbol | F16L 11/083 138/134 |

* cited by examiner

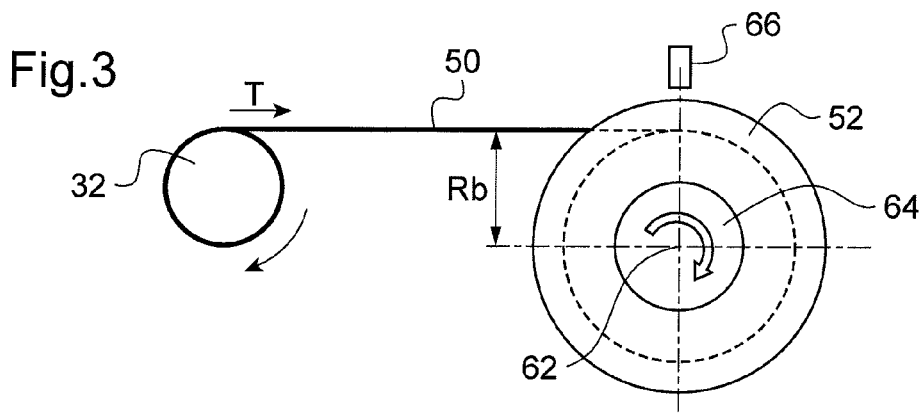
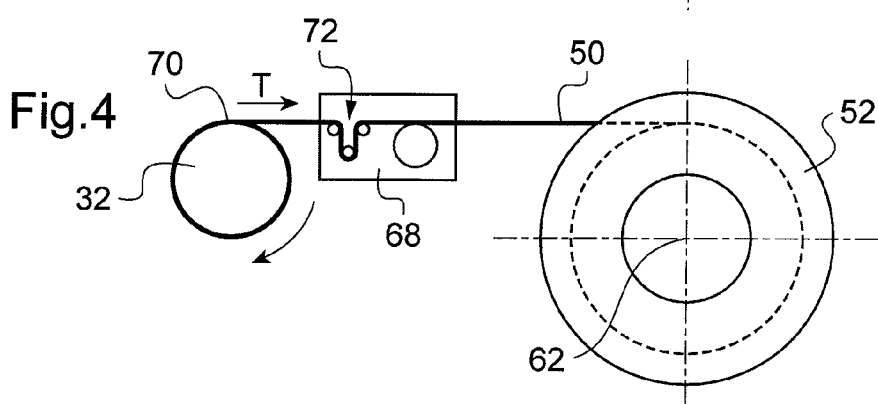
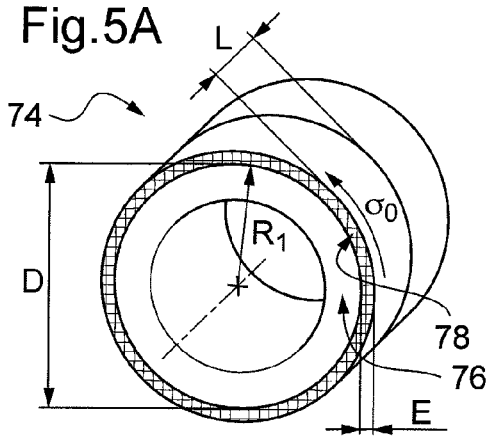
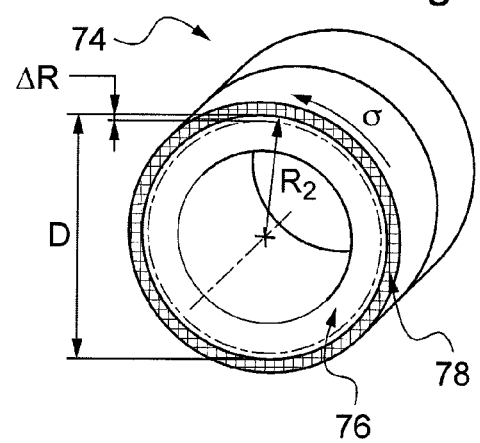
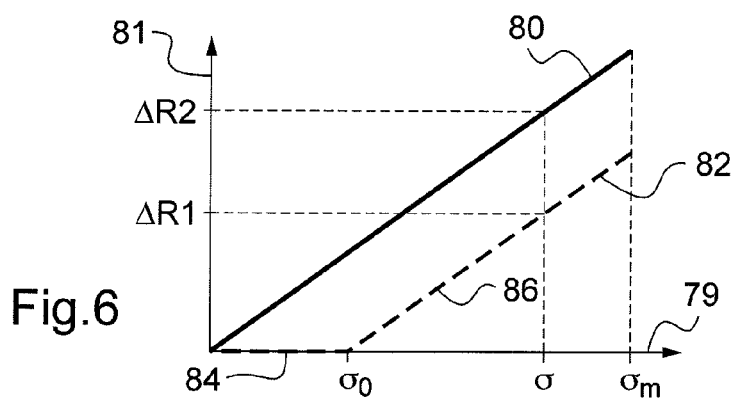

FLEXIBLE TUBULAR UNDERWATER PIPE FOR GREAT DEPTHS, AND METHOD FOR MANUFACTURING SAME

CROSS-REFERENCE TO RELATED APPLICATIONS

The present application is a 35 U.S.C. §§371 national phase conversion of PCT/FR2012/050662, filed Mar. 29, 2012, which claims priority of French Patent Application No. 1152609, filed Mar. 29, 2011, the contents of which are incorporated by reference herein. The PCT International Application was published in the French language.

BACKGROUND OF THE INVENTION

The present invention relates to a method for manufacturing a flexible tubular underwater pipe for transporting fluids of hydrocarbon or other type, intended for use in particular at great depths. It relates also to a pipe obtained according to the method that is the subject of the invention.

It relates more particularly to the pipes of the unbonded type described notably in the following normative documents published by the API (American Petroleum Institute):
API 17J Specification for Unbonded Flexible Pipe.
API RP 17B Recommended practice for Flexible Pipe.

Also, in order to manufacture these flexible tubular pipes, a leakproof tubular structure is provided, consisting essentially, from inside to outside, of a leakproof sheath or pressure sheath, a pressure vault made of a profile wire wound with short pitch around the sheath, and at least one layer of armor wires wound in a helix with long pitch around said pressure vault. In the present application, the term "with short pitch" corresponds to a helix angle of between 70° and 90°, whereas the term "with long pitch" corresponds to a helix angle less than 60°. The hydrocarbon is intended to flow inside the leakproof sheath. The pressure vault takes up the radial forces which are exerted on the pipe, whereas the layer of armor wires takes up the axial pulling forces.

Furthermore, the layer of armor wires is usually covered with an outer sealing sheath, so as to protect the abovementioned various underlying layers from the surrounding water.

Some flexible pipes do not include a pressure vault, but have, in this case, crossed reinforcements wound with a helix angle close to 55°, this particular angle enabling the reinforcements to take up both radial and axial forces.

These pipes, when they are installed in an underwater environment, are subjected to external pressures which can be higher than the internal pressure that prevails inside. Also, an axial compression may occur, which is known to those skilled in the art as the reverse end cap effect. This effect tends to shorten the pipe. These axial compression forces can reach a very high level. For example, a pipe transporting gas with an outer diameter of 300 mm installed at a depth of 2000 m can be subjected to an axial compression force of the order of 140 tonnes when it is depressurized. The pipe is then subjected to an external pressure of approximately 200 bar, whereas the internal pressure is around 1 bar.

The reverse end cap effect thus has the tendency to axially compress the flexible pipe, and thereby, shorten its length, which tends to increase its diameter. This phenomenon also has the effect of causing an inflation of the pulling armor plies, that is to say a radial excursion of the armor wires. In the case where the outer sheath of the pipe is leakproof, the hydrostatic pressure prevailing outside the pipe effectively opposes the inflation of the pulling armor layers. By contrast, if the outer sheath is no longer leakproof, for example following an accidental tear, the water invades the interior of the outer sheath and the latter is no longer pressed by force at the hydrostatic pressure against the layers of armor wires and therefore no longer opposes the inflation. Consequently, in the absence of an additional means designed to limit this inflation, the wires that make up the pulling armor plies may buckle according to a radial mode, which may cause an irreversible local deformation of said layers of armor wires, which take on a "bird cage" shape. The flexible pipe is then denatured locally.

One known solution that makes it possible to reduce this risk of radial buckling in "bird cage" form consists in winding in a helix with short pitch, around the layers of pulling armor wires, aramid fiber-reinforced tapes, said tapes exhibiting a high mechanical tensile strength on their longitudinal axis. This anti-inflation layer specifically makes it possible to limit the inflation of the layers of pulling armor wires. These tapes also exhibit a great deflection flexibility, which simplifies the operations of handling and of winding around the armor plies. Finally, given equal mechanical characteristics, they are much lighter than metal tapes, which makes it possible to reduce the weight of the flexible pipe.

Reference can notably be made to documents WO03/083343, FR2926347 and WO2008/135663, which describe such types of pipes.

However, this solution has a number of drawbacks. First of all, these aramid fiber-reinforced tapes are very costly. Furthermore, this solution does not totally solve the problem of lateral buckling of the armor wires, notably when the pipe is simultaneously subjected to variations of curvature, notably in proximity to the sea bed. In this area, the pipe can be stressed simultaneously by axial compression, by the reverse end cap effect, and deflection, by the movements of the floating support to which the pipe is connected. In these conditions, given that the armors no longer have the possibility of inflating freely according to a radial mode, it is still possible for them to buckle according to a lateral or circumferential mode.

Also, one problem that arises and that the present invention aims to resolve, is how to provide a flexible pipe which not only can be manufactured at an advantageous cost, but also which better withstands the reverse end cap effect.

SUMMARY OF THE INVENTION

To this end, the present invention proposes, according to a first aspect, a method for manufacturing a flexible tubular underwater pipe intended to transport hydrocarbons, said method being of the type in which, on the one hand, a leakproof tubular structure is provided, covered with at least one layer of armor wires wound in a helix with long pitch around said tubular structure to be able to take up the axial forces when said tubular structure is stretched axially, and on the other hand, at least one continuous longitudinal element made of a deformable material is wound in a helix with short pitch around said layer of armor wires to form a holding layer capable of taking up the radial forces of said armor wires when said tubular structure contracts axially. According to the invention, said longitudinal element is wound under a longitudinal tension $T_0$ so as to stretch said deformable material according to a relative elongation corresponding to a tensile stress $\sigma_0$ less than the elastic limit value $\sigma_E$ of said deformable material, said elastic limit value $\sigma_E$ corresponding to a tensile stress beyond which the deformation of said material is irreversible.

Thus, one feature of the invention lies in the stretching of the deformable material of the longitudinal element during the winding around the layer of armor wires, and with account taken of the elastic limit value $\sigma_E$ of said deformable material.

Preferentially, said material is stretched according to a relative elongation corresponding to a tensile stress $\sigma_0$ between said elastic limit value $\sigma_E$ and a twentieth of said elastic limit value $\sigma_E$.

Furthermore, advantageously, said tensile stress $\sigma_0$ is between a twentieth and a third of said elastic limit value $\sigma_E$. Preferentially, said tensile stress $\sigma_0$ is between a tenth and a quarter of said elastic limit value $\sigma_E$.

In addition, a leakproof outer sheath is advantageously formed around said holding layer in order to protect the interior of the pipe.

Also, the inflation of the armors is attenuated when, on the one hand the submerged pipe is subjected to a significant reverse end cap effect and on the other hand the outer sheath is no longer leakproof. Although it is generally, it may be that an accidental tear might provoke a flooding of the annular space contained between the pressure sheath and, specifically, the outer sheath, and the annular space is then restored to hydrostatic pressure. Now, it has been proven that the inflation of the armors is significantly weaker when the deformable material of the longitudinal element has been previously pretensioned according to the invention, in comparison to the armors surrounded by a longitudinal element wound without tension or with a weak tension linked to the manufacture in accordance with the prior art.

Contrary to what might be thought, the fact of pretensioning the longitudinal element of the anti-inflation layer does not increase the maximum axial stress that it will have to endure during the life of the tubular pipe. This modification affects only the time for which it is stressed by pulling.

Preferentially, a plurality of continuous longitudinal elements are wound to form said anti-inflation holding layer so as to further increase the resistance of the armors to radial inflation. Furthermore, said at least one continuous longitudinal element is formed in a strip, which simplifies its application. In the case of the implementation of a plurality of strips, they are wound simultaneously around the pulling armors as will be explained hereinafter in the description.

The tensile stress $\sigma_0$ is defined as being the average pretensile stress in a transverse section of the continuous longitudinal element. Consequently, $\sigma_0$ is equal to the ratio of the pretension $T_0$ to the transverse section of the continuous longitudinal element.

The elastic limit value $\sigma_E$ of the deformable material is measured by performing a tensile strength test on a sample of the continuous longitudinal element, a conventional test that makes it possible to obtain a tensile strength curve representing the trend of the average tensile stress as a function of the elongation of the sample. As long as the stress applied to the sample remains below the elastic limit value $\sigma_E$, the tensile strength curve exhibits a linear character, the elongation then being proportional to the stress, and the deformations remaining reversible. When the stress applied becomes greater than $\sigma_E$, the sample is irreversibly deformed and the tensile strength curve loses its initial linearity. From this tensile strength curve, a person skilled in the art can easily determine the elastic limit value $\sigma_E$, also called elastic limit, which is therefore the average tensile stress in the section of the continuous longitudinal element, at the point of transition between, on the one hand, the region of linear and reversible behavior and, on the other hand, the region of irreversible deformations. In the case where the continuous longitudinal element is either entirely metallic, or reinforced with metal fibers or cables, there is a region of plastic deformation between the elastic limit and the yield point, the elastic limit then being significantly lower than the yield point. In the case where the continuous longitudinal element is reinforced with aramid, carbon or glass fibers, there is almost no ductile region, the elastic limit then being virtually the same as the yield point.

According to the invention, the inflation of the armors is reduced, compared to the methods according to the prior art, without in any way increasing the number and/or the thickness and/or the resistance of the strips of said deformable material, that is to say without increasing the raw material costs. In addition, as will be explained hereinbelow in the detailed description, it is possible to envisage reducing the number of strips of the deformable material compared to that of the pipes of the prior art, while obtaining similar properties of resistance to inflation of the armors.

Moreover, the fact of further reducing the inflation has a beneficial effect with regard to the resistance to axial compression of the pipe. The weaker the inflation, the less chance the armors have of overlapping, so they are more stable, which also indirectly enhances the resistance to lateral buckling. To avoid the overlapping of the armors, the anti-inflation holding layer is dimensioned in such a way that the radial inflation of the armor wires remains less than their thickness, and more advantageously, than their half-thickness.

The method according to the invention is advantageously implemented on leakproof tubular structures having a diameter greater than 250 millimeters, because the inflation of the armors is roughly proportional to the diameter of the pipes.

In addition, the method according to the invention is advantageously implemented on tubular structures in which said armor wires have a thickness less than 6 millimeters, preferentially less than 3 mm. The invention is all the more advantageous when the thickness of said armor wires is small, because it then makes it possible to effectively limit the inflation below the thickness of said wires. Such is, for example, the case of the composite armors made of epoxy carbon that have a thickness of the order of 1 millimeter. If the aim is to have such pipes work in axial compression mode, the pipe has to be equipped with a very powerful holding layer capable of keeping the inflation below 1 millimeter in amplitude and preferentially below 0.5 millimeters. According to the prior art, such layers are very costly, since it is necessary to sometimes superpose up to 6 to 8 layers of Kevlar® strips, each strip having a thickness of the order of 0.6 millimeter, to meet the need. The fact of pretensioning these strips makes it possible to obtain the same result while saving up to 4 layers, as will be explained in more detail hereinbelow in the description.

Moreover, the method according to the invention is advantageously implemented on leakproof tubular structures having armor wires wound with long pitch with an armoring angle greater than or equal to 20°. The inflation is an increasing function of the helical angle of winding of the armors. The invention is therefore all the more advantageous when the armoring angle is high. Such is the case for the pipes having an armor angle close to 55°, particularly when these structures also have a significant diameter, such as, for example, the smooth-bore gas transport structures of the type of those disclosed in document WO2008/145861. Here again, it makes it possible to significantly reduce the number of layers of strips.

The object of the invention equally makes it possible to reduce the possibilities of inflation without in any way reducing the number of layers or the cost, so as to improve the resistance to axial compression of the pipe in extreme water depth and dynamic stress conditions, and to reduce the number of layers and consequently the cost for a reduction of the possibilities of inflation identical to those of the prior art.

Furthermore, said longitudinal tension $T_0$ is advantageously greater than or equal to 250 daN, more advantageously greater than or equal to 350 daN, even more advantageously greater than or equal to 500 daN, and preferentially greater than or equal to 1000 daN. In the present application, the tensions are expressed in deca Newtons, with the symbol daN. The above tension levels are very much greater than those of the prior art, and their implementation requires the use of new, much more powerful and costly installations.

Furthermore, according to another embodiment, the ratio $T_0/L$ between, on the one hand, said longitudinal tension $T_0$ expressed in deca Newtons, and, on the other hand, the width L of said continuous longitudinal element expressed in centimeters (symbol cm), is greater than or equal to 20 daN/cm, advantageously greater than or equal to 40 daN/cm and preferentially greater than or equal to 80 daN/cm.

BRIEF DESCRIPTION OF THE DRAWINGS

Other features and advantages of the invention will emerge on reading the description given below of a particular embodiment of the invention, given as a nonlimiting indication, with reference to the attached drawings in which:

FIG. 3 is a detail transversal schematic view of the installation represented in FIG. 2, according to a first variant embodiment;

FIG. 4 is a detail transversal schematic view of the installation represented in FIG. 2, according to a second variant embodiment;

FIGS. 5A and 5B are perspective views showing the section of the flexible tubular pipe illustrated in FIG. 1; and, FIG. 6 is a graph illustrating the behavior of the pipe illustrated in FIG. 1.

DESCRIPTION OF EMBODIMENTS

Figure 1:
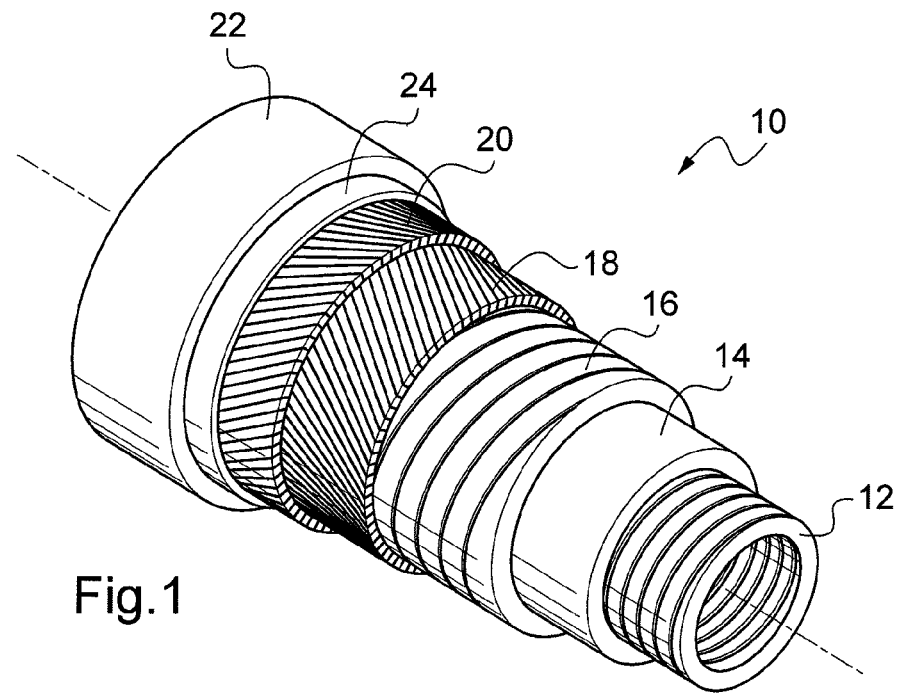
FIG. 1 is a perspective schematic view showing the structure of a flexible tubular pipe according to the invention.

FIG. 1 illustrates a flexible pipe 10 that is the subject of the present invention and obtained according to the method that is also the subject of the invention and that will be described hereinbelow. This pipe is of "rough-bore" type, but the invention applies also to the pipes of "smooth-bore" type. The pipe is said to be "rough-bore" because it comprises, as innermost layer, an internal carcass 12 made of a wire of staple form. Then, from inside to outside, it comprises an inner sealing sheath 14, a pressure vault 16, a pair of plies of crossed tension armors 18, 20, and an outer protection sheath 22. Furthermore, the pipe 10 comprises at least one anti-inflation layer 24 that is the subject of the invention, surrounding the plies of pulling armors 18, 20, and produced by winding longitudinal elements made of strips of a synthetic deformable material. Other forms of longitudinal elements can be implemented, for example synthetic cords.

Figure 2:
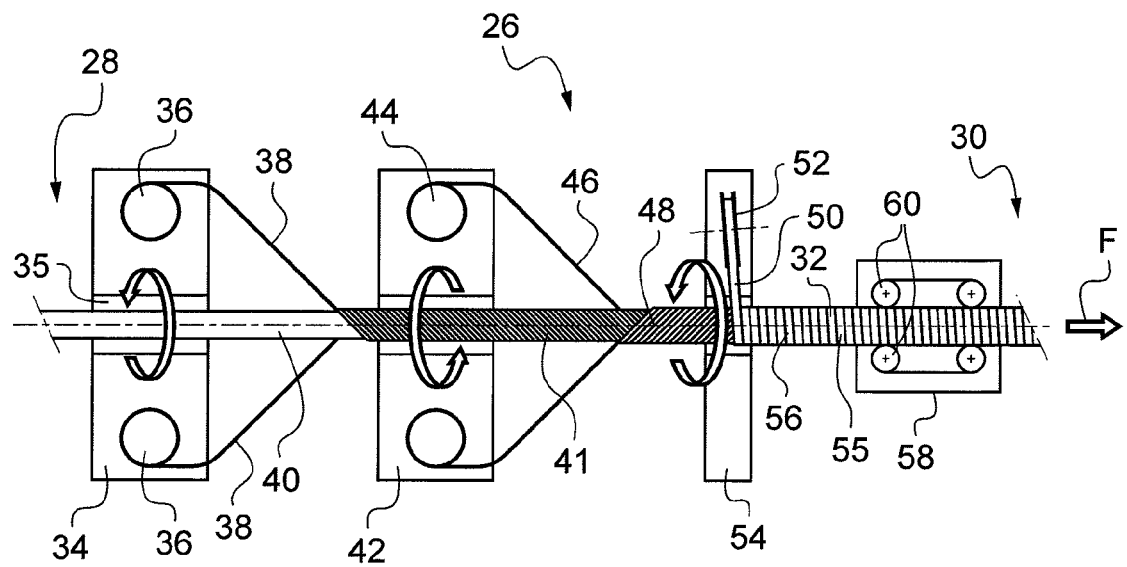
FIG. 2 is a schematic view showing an installation for manufacturing a flexible tubular pipe according to the invention.

An armoring installation 26 will now be described, with reference to FIG. 2, that makes it possible to implement the manufacturing method according to the invention for manufacturing a flexible pipe. The armoring installation 26 extends longitudinally between an upstream 28 and a downstream 30, and a section of flexible tubular pipe 32 being manufactured extends through the armoring installation 26 between the upstream 28 and the downstream 30. The flexible tubular pipe is driven in translation according to the arrow F from the upstream 28 to the downstream 30.

The armoring installation 26 comprises, toward the upstream end 38, a first support wheel 34 having a first center 35 that passes through a first section portion 40. The first support wheel 34 comprises a plurality of first coils 36, for example eighty, on each of which is wound a first armor wire 38. The first support wheel 34 is driven in rotation in a given direction to wind the first armor wires 38 in contiguous helixes around the section portion 40, and bearing on the pressure vault, identified 16 in FIG. 1. A first layer of pulling armor is then formed on a second portion 41.

The armoring installation 26 also comprises, spaced apart from the first support wheel 34, towards the upstream end 38, a second support wheel 42, substantially identical to the first, but driven in the reverse direction to said given direction. It comprises a plurality of second coils 44 of second armor wires 46 which are wound in contiguous helixes in a crossed manner on the first armor wires 38. A third portion 48 is covered with a second layer of pulling armor.

The third portion 48 will then be covered with an anti-inflation strip 50, which is stored on a strip reel 52 mounted on a spiral winder 54. The spiral winder will be described hereinbelow in detail, said spiral winder making it possible to wind the anti-inflation strip 50 in a helix to form contiguous spirals 55. A fourth portion 56 is then covered with an anti-inflation strip 50 and it engages in a driving device 58 comprising at least two caterpillar gears 60. This device makes it possible to pull the pipe through the armoring installation to simultaneously produce the abovementioned different layers.

A first embodiment of the spiral winder 54 will now be detailed with reference to FIG. 3, said spiral winder making it possible to apply the anti-inflation strip 50 by imparting on it a tension T.

As will be explained hereinbelow in more detail, the anti-inflation strip 50 is produced from a deformable synthetic material made of woven fibers, for example aramid fibers. According to the invention, the strip 50 is stretched according to a longitudinal tension $T_0$ so as to stretch said deformable material according to a relative elongation corresponding to a tensile stress $\sigma_0$ less than the elastic limit value $\sigma_E$ of said deformable material, for example to $\sigma_E$ is between 5% and 30% of the elastic limit value $\sigma_E$.

FIG. 3 once again shows the flexible pipe 32 in cross section and the anti-inflation strip 50 stored wound on the strip reel 52. The strip reel 52 has a freely rotating shaft, the direction of which is substantially inclined relative to a direction parallel to the pipe 32 so as to form the contiguous spirals 55. The spiral winder makes it possible to drive the strip reel 52 in rotation around the flexible pipe 32 according to the clockwise direction in FIG. 3, while it pays out freely while retaining the inclination of its shaft relative to the pipe 32.

According to this first embodiment, the tension T is adjusted by braking the strip reel 52. The shaft of the reel is equipped with a brake 64 which opposes the rotation thereof. The stronger the braking, the stronger the tension
    imparted on the strip 50. In order for the tension to remain substantially constant, the braking on the shaft of the reel 62 should be slaved to the outer radius Rb of the strip wound on the reel 52. At the start of manufacture, the reel is full and Rb is maximum. As the reel pays out, Rb decreases to reach a minimum value when the reel is almost empty. Now, the tension imparted on the strip 50 is equal to the ratio of the braking torque applied by the brake to the shaft of the reel 62 and the radius Rb.

In order to keep the tension T constant and consequently compensate the reduction of the outer radius Rb, the braking torque has to be reduced at the same time. Also, the strip reel 52 is equipped with means 66 for measuring the radius Rb, for example a sensor of rolling roller type bearing on the wound strip and mounted on a moving support of cylinder or spring type, or else a distance sensor, and the braking torque is reduced in real time according to the measurements of the outer radius Rb.

According to a second embodiment illustrated in FIG. 4, again showing the pipe 32, the strip 50 and the reel 52 on which it is wound, the tension T of the strip 50 is kept at a constant value by controlled braking means 68, arranged between the strip reel 52 and the tangential point 70 of placement on the flexible pipe. These controlled braking means 68 may, for example, consist of a capstan equipped with a brake slaved to a tension measurement performed by a three-roller system 72 equipped with a force sensor.

Reference will now be made to FIG. 4 schematically showing pipe sections provided with an anti-inflation strip, to illustrate the manufacturing method according to the invention.

FIG. 5A shows a section of flexible tubular pipe 74 having, from inside to outside, a leakproof tubular structure 76 covered with two layers of armor wire and an anti-inflation strip 78. The latter, of inner diameter D and of inner radius R (R=D/2), has a width L and a thickness E and it is wound in a helix with contiguous turns with a helix angle close to 90°.

During the manufacturing of the pipe, the strip is therefore wound under a longitudinal tension $T_0$ around the pulling armors, which generates a circumferential prestress $\sigma_0$ less than the elastic limit of the material of the strip. This prestress $\sigma_0$ has the effect of tightening the pulling armors and generates an initial contact pressure $P_0$ between the strip 78 and the armors. This initial contact pressure $P_0$, also called pre-tightening pressure, is substantially equal to the circumferential prestress $\sigma_0$ which is a factor of the quotient of the thickness of the strip 78 and of the radius R of the inner diameter of the strip 78 ($P_0 \approx \sigma_0 E/R$).

Moreover, the longitudinal tension $T_0$ is equal to the circumferential prestress $\sigma_0$ which is a factor of the thickness E of the strip and of its width L. Also, the longitudinal tension $T_0$ is substantially equal to the pre-tightening pressure $P_0$ which is a factor of the width of the strip 78 and of the radius R of the inner diameter of the strip 78 ($T_0 \approx P_0 L R$).

Furthermore, it was found that, surprisingly, a beneficial effect of the strip 50 occurred as soon as the pre-tightening pressure $P_0$ between the strip 78 and the pulling armors was greater than only a few percent of the maximum hydrostatic pressure $P_{ext}$ that the pipe has to be able to withstand, that is to say the hydrostatic pressure on the sea bed. As will be illustrated below, the beneficial effect occurs when the pre-tightening pressure $P_0$ is greater than 4% of the hydrostatic pressure $P_{ext}$, and advantageously greater than 10% of $P_{ext}$. It will be seen however that the means to be implemented to impart a corresponding longitudinal tension on the strip have to be adapted given the very significant level of the forces.

For example, if the pipe has to be implemented at a depth of 3000 m, the maximum hydrostatic pressure $P_{ext}$ that it must be able to withstand is approximately 300 bar, and the circumferential prestress $\sigma_0$ determined using the longitudinal tension $T_0$ of the strip on laying, advantageously has to be set such that the pre-tightening pressure $P_0$ has to be greater than 12 bar, for example 30 bar. In these conditions, since the pre-tightening pressure $P_0$ is clearly lower than the hydrostatic pressure $P_{ext}$, the internal metal layers of the pipe easily support this pre-tightening pressure $P_0$.

The reverse end cap effect, which occurs when the outer protection sheath is perforated and the annulus is flooded, generates an axial force F of axial compression which tends to cause the armor plies to inflate. It is then the strip which limits and contains this inflation.

Because of this, a contact radial pressure $P_c$ is then created at the interface between the armors and the strip, a pressure that we will call inflation pressure. This inflation pressure $P_c$, which opposes the pre-tightening pressure $P_C$, The inflation pressure $P_c$ is all the greater as F increases, and varies substantially linearly as a function of F.

In the case where the inflation pressure $P_c$ remains less than the pre-tightening pressure $P_0$, the armors do not inflate, and the inner radius of the strip 78 then remains equal to R. Since the strip 78 then retains a constant elongation, the circumferential stress in the strip 78 also remains constant and equal to $\sigma_0$.

As illustrated in FIG. 5B, when the inflation pressure $P_c$ is greater than the pre-tightening pressure $P_0$, the armors inflate, and the inner radius of the strip 78 increases by the value $\Delta R1$, changing from the value R in the initial state, to the value $R+\Delta R1$ after inflation. Because of this inflation, the strip 78 undergoes a relative elongation equal to the ratio $\Delta R1/R$, an elongation that generates, in said strip, an additional circumferential stress $\sigma_c$ which is equal to the product of the ratio $\Delta R1/R$ by the modulus of elasticity in tension G of the strip ($\sigma_c = G \Delta R1/R$). At this stage, the total circumferential stress $\sigma$ in the strip 78 is the sum of the prestress $\sigma_0$ and of the additional stress $\sigma_c$ ($\sigma = \sigma_0 + \sigma_c$). Moreover, the total circumferential stress $\sigma$ in the strip 78 is substantially proportional to the inflation pressure $P_c$ and to the radius of the strip R and inversely proportional to the thickness of the strip E ($\sigma \approx P_c R/E$). It follows therefrom that the inflation $\Delta R1$ is substantially proportional to the difference between the inflation pressure $P_c$ and the pre-tightening pressure $P_0$:

$$\Delta R1 = R \sigma_c G = R(\sigma - \sigma_0)/G \approx R^2 (P_c - P_0)/(GE)$$

Moreover, if we consider a pipe of the prior art with a strip 78 that has not been prestressed ($\sigma_0 \approx 0$), but with other characteristics that are otherwise identical to those of the pipe illustrated in FIG. 5A, and the same axial compression force F is applied to this pipe, an inflation $\Delta R2$ of the armors is obtained which is given by the following equations:

$$\Delta R2 = R \sigma/G \approx R^2 P_c/(GE)$$

It follows therefrom that $\Delta R2$ is greater than $\Delta R1$, which shows that the application of a prestress to the strip 78 according to the present invention makes it possible to reduce the inflation of the armors.

This technical effect is illustrated graphically in FIG. 6. In this figure, a graph is represented in which the circumferential stress $\sigma$ is given on the x axis 79, whereas the variation of the inner radius R of the strip 78 is given on the y axis 81. Furthermore, a solid line has been used to represent a first curve of variation 80 of an anti-inflation strip not prestressed at the time of laying (prior art) and a broken line has been used to represent a second curve of variation 82 of the strip 78 that has a prestress $\sigma_0$. It will be observed that these two curves are parallel straight lines with a slope that is proportional to the radius R and inversely proportional to the modulus of elasticity G.

Thus, as long as the axial force F is low and remains so sufficiently for the inflation pressure $P_c$ that the armors tend to exert against the inner face of the strip remains less than the prestress pressure $P_0$, there is no inflation. The circumferential stress $\sigma$ remains equal to the circumferential prestress $\sigma_0$ and the situation that prevails corresponds to the point 84 of the second curve 82.

On the other hand, when the axial force F becomes sufficiently strong to generate a counter-inflation pressure $P_c$ greater than the contact pressure $P_0$ associated with the circumferential prestress $\sigma_0$, the armors and the strips begin to inflate according to the slope 86 of the second curve of variation 82.

Thus, for a given circumferential stress $\sigma$, the variation of inner radius $\Delta R1$ for the prestressed anti-inflation strip and corresponding to the second curve of variation 82, is less than the variation $\Delta R2$ for the anti-inflation strip without prestress and corresponding to the first curve of variation 80. It will also be noted, in the graph of FIG. 6, that the saving on the inflation is all the greater as the circumferential prestress $\sigma_0$ increases.

Regarding the circumferential stresses, the invention is distinguished from the prior art not by the maximum level of stresses that the anti-inflation strip will be able to undergo during its life, a level that remains the same, but rather by the duration for which the lower level stresses are applied. To illustrate this point, we take the example of a pipe that has a life of twenty years and that has to undergo a compression axial force F, only during its last year of service. According to the prior art, the circumferential stress in the anti-inflation strip remains almost zero during the first nineteen years then becomes equal to $\sigma$ during the last year. According to the present invention, the circumferential stress in the anti-inflation strip is equal to the prestress of $\sigma_0$ during the first nineteen years then becomes equal to $\sigma$ during the last year.

In all the cases, it is obvious that the circumferential prestress $\sigma_0$ and the stress $\sigma$ should remain below the elastic limit of the strip. Advantageously, as a safety measure, a maximum stress $\sigma_m$ is determined that must not be exceeded, $\sigma_m$ being less than $\sigma_E$, $\sigma_m$ being typically between half and three quarters of $\sigma_E$.

According to the manufacturing method in accordance with the invention as described above, reference is made to a single, spiral-wound anti-inflation strip. This presentation has been used to simply present the problem posed and its solution. However, for the flexible tubular pipes, according to the prior art, it is common practice to wind a plurality of anti-inflation strips. It is also necessary to implement a plurality of anti-inflation strips according to the invention, but fewer in number, which represents an economic advantage.

Different methods of implementation illustrating these pipes will now be described.

Returning to FIG. 1, according to a first implementation, the flexible tubular pipe is a pipe with an internal diameter of 280 mm which comprises, from inside to outside, the following layers:

an inner carcass of stainless steel stapled strip 15 mm thick;
a pressure sheath 14 mm thick;
a pressure vault of staple profile wire 21 mm thick;
a first anti-wear polymeric layer 1.5 mm thick;
a first armor ply 5 mm thick;
a second anti-wear polymeric layer 1.5 mm thick;
a second armor ply 5 mm thick;
a third anti-wear polymeric layer 1.5 mm thick;
a third armor ply 5 mm thick;
a fourth anti-wear polymeric layer 1.5 mm thick;
a fourth armor ply 5 mm thick;
an anti-inflation layer made of Kevlar® strips; and,
a polymeric outer sheath 13 mm thick.

This structure with a large diameter is intended to be used at very great depths close to 3000 m. This is why it includes a carcass and a pressure vault that are both very thick, as well as four armor plies which are also relatively thick.

According to the prior art, the anti-inflation layer of such a pipe has to have eight layers of woven Kevlar® strips with high modulus of elasticity. Each strip layer has a thickness of the order of 0.5 mm, or 4 mm in total for the eight superposed layers. Each of these eight layers is produced by turns that are contiguous and with short pitch using a winding installation similar to the apparatus 54 of FIG. 2. The anti-inflation strips are woven strips of width L equal to 130 mm, 0.5 mm thick, having a tensile strength at the elasticity threshold of the order of 8600 daN, an average elastic limit $\sigma_E$ of the order of 1300 MPa, and an average modulus of elasticity of the order of 105 GPa.

According to the prior art, the tension for laying these strips is low, typically of the order of 5 daN to 20 daN, and the machines used to wind the strips around the pipe are light and low power machines. These inexpensive machines are generally called "wrapping machines" or "winding machines", unlike the "spiral winders" which are much more powerful and expensive machines.

This pipe is designed to withstand, through 3000 m of depth, a reverse end cap effect that is very significant in the worst case where, on the one hand, the pipe is depressurized with 300 bar outside and 1 bar inside, and, on the other hand, the outer sheath has lost its seal and the annulus is flooded. In these extreme conditions, the abovementioned eight layers of Kevlar® strip are capable of limiting the radial inflation of the armors below 1.5 mm. Since this maximum inflation is significantly less than the thickness of the 5 mm armor wires, the risk of overlapping of the wires is kept at bay and the stability of the armor plies is assured. In these maximum inflation conditions, the strips are subjected to a loaded longitudinal tension of the order of 2000 daN which remains very much less than the tensile strength at the elasticity threshold which is of the order of 8600 daN. It is also possible to reason in terms of average stresses in the transverse section of the strip, the tension of 2000 daN corresponding to an average stress of the order of 308 MPa, said average stress remaining very much lower than the elastic limit $\sigma_E$ of the order of 1300 MPa. The main drawback with this prior art solution is the high cost of the anti-inflation layer, since it is necessary to provide 8 layers of Kevlar® strip and install them around the tubular pipe.

By virtue of the present invention, the number of layers of the anti-inflation strip can be reduced by pre-tensioning the strips according to table I below. It will be observed, in this table, that the tension measurements are expressed in deca Newtons, using the symbol daN.

TABLE I

| Pretension $T_0$ of the strips during manufacture | Ratio $T_0/L$ | Prestress $\sigma_0$ as a % of the elastic limit of the strips | Number n of layers of Kevlar ® | Maximum radial inflation $\Delta R$ of the armors | Maximum tension undergone in service by each strip |
|---|---|---|---|---|---|
| 20 daN | 1.5 daN/cm | 0.2% | 8 | 1.5 mm | 2000 daN |
| 260 daN | 20 daN/cm | 3% | 7 | 1.5 mm | 2000 daN |

TABLE I-continued

| Pretension $T_0$ of the strips during manufacture | Ratio $T_0/L$ | Prestress $\sigma_0$ as a % of the elastic limit of the strips | Number n of layers of Kevlar® | Maximum radial inflation $\Delta R$ of the armors | Maximum tension undergone in service by each strip |
|---|---|---|---|---|---|
| 650 daN | 50 daN/cm | 7.5% | 6 | 1.5 mm | 2000 daN |
| 1170 daN | 90 daN/cm | 13.6% | 5 | 1.5 mm | 2000 daN |
| 2000 daN | 154 daN/cm | 23.2% | 4 | 1.5 mm | 2000 daN |
| 3400 daN | 262 daN/cm | 39.5% | 3 | 1.5 mm | 3400 daN |

The first line corresponds to the prior art whereas the other five lines corresponding to five embodiments according to the present invention.

The embodiment corresponding to the fifth line of this table is particularly advantageous. It makes it possible to halve the number of layers of Kevlar® compared to the prior art, while retaining a maximum inflation of the armors that is identical and while avoiding subjecting the strips to maximum stresses greater than those of the prior art. In this embodiment, the prestress tension $T_0$ is equal to 2000 daN, which corresponds to a tension prestress $\sigma_0$ equal to 23.2% of the elastic limit $\sigma_E$, and to a ratio $T_0/L$ equal to 154 daN/cm.

The embodiment of the last line of table I is less advantageous, although it makes it possible to eliminate an additional layer of Kevlar®, because it requires the application of a very high tension $T_0$ which has the drawbacks of increasing the stresses in service in the strips, and of entailing the use of a high power spiral winder to perform the operation of winding said strips.

The embodiment of the third line of table I offers the benefit of being able to be implemented with a spiral winder of moderate power, while allowing for a significant saving on the number of layers of Kevlar®.

According to a second implementation, a pipe with an inner diameter of 230 mm is produced. It comprises, from inside to outside, the following layers:

an inner carcass of stainless steel stapled strip 12.5 mm thick;
a pressure sheath 10 mm thick;
a pressure vault of stapled profile wire 21 mm thick;
an anti-wear polymeric layer 1.5 mm thick;
a first armor ply 5 mm thick;
an anti-wear polymeric layer 1.5 mm thick;
a second 5 mm armor ply;
an anti-inflation layer of Kevlar® strips; and,
a polymeric outer sheath 10 mm thick.

This structure is also intended to be used at depths of the order of 3000 m. According to the prior art, the anti-inflation layer of this pipe comprises 6 layers of woven Kevlar® strips identical to those described in the first implementation above.

According to the present invention, the number of layers of the anti-inflation strip can be reduced by pre-tensioning the strips according to table II below:

TABLE II

| Pretension $T_0$ of the strips during manufacture | Ratio $T_0/L$ | Prestress $\sigma_0$ as a % of the elastic limit of the strips | Number n of layers of Kevlar® | Maximum radial inflation $\Delta R$ of the armors | Maximum tension undergone in service by each strip |
|---|---|---|---|---|---|
| 20 daN | 1.5 daN/cm | 0.2% | 6 | 1.5 mm | 2600 daN |
| 520 daN | 40 daN/cm | 6% | 5 | 1.5 mm | 2600 daN |
| 1300 daN | 100 daN/cm | 15.1% | 4 | 1.5 mm | 2600 daN |
| 3380 daN | 260 daN/cm | 39.3% | 3 | 1.5 mm | 3380 daN |

The first line corresponds to the prior art whereas the following 3 lines correspond to 3 embodiments of the present invention.

The embodiment of the third line is particularly advantageous. It makes it possible to save two layers of Kevlar® compared to the prior art, while retaining a maximum inflation of the armors that is identical and while avoiding subjecting the strips to maximum stresses greater than those of the prior art. In this embodiment, the prestress tension $T_0$ is equal to 1300 daN, which corresponds to a tension prestress $\sigma_0$ equal to 15.1% of the elastic limit $\sigma_E$, and to a ratio $T_0/L$ equal to 100 daN/cm.

Moreover, according to said other aspect of the method according to the invention, the maximum pressure of the sea bed $P_{ext}$ in which the flexible underwater tubular pipe is likely to be laid is evaluated, then the number of layers n of anti-inflation strips and the longitudinal tension $T_0$ to be applied to each of the strips are determined according to the following criterion involving the maximum pressure of the sea bed $P_{ext}$, the width L of each strip and the inner radius R of the innermost layer of strips:

$$nT_0 > 0.04 RLP_{ext}$$

Finally, once n and $T_0$ have thus been determined, the n layers of strips are wound under the tension $T_0$.

In practice, as has been explained above, the control of the inflation would be perfect if the contact pressure $P_0$ exerted against the outer face of the armors by virtue of the pretension of the strip was equal to the maximum hydrostatic pressure of the sea bed $P_{ext}$. There would then be no possibility of inflation, the strip would in fact reproduce the tightening pressure produced by a leakproof outer sheath against which the hydrostatic pressure of the sea bed $P_{ext}$ is applied. This would in fact amount to reproducing, in a flooded annulus, the contact pressures of a dry annulus.

However, it is not necessary to look for a pre-tightening pressure $P_0$ that is as high, because it has been found that, surprisingly, the beneficial effects for the pipe can be obtained when $P_0$ becomes greater than 4% of the maximum hydrostatic pressure of the sea bed $P_{ext}$, and advantageously of the order of 10% of $P_{ext}$. The coefficient 0.04 of the criterion cited above corresponds to the 4% criterion because:

$$P_0 \approx (nT_0)/(RL) \Rightarrow P_0/P_{ext} \approx (nT_0)/(RLP_{ext})$$

And, consequently:

$$P_0/P_{ext} > 4\% \Rightarrow nT_0 > 0.04 RLP_{ext}$$

It is also advantageously possible to determine the longitudinal tension $T_0$ and the number n of layers such that the pre-tightening pressure $P_0$ is greater than 10% of the maximum hydrostatic pressure $P_{ext}$. According to this embodiment, the criterion determining $T_0$ and n then becomes:

$$nT_0 > 0.1 RLP_{ext}$$

By reverting to the elements of the first implementation presented above, where the maximum pressure of the sea bed $P_{ext}$ is equal to 300 bar, that is to say 30 MPa, corresponding to a depth of 3000 m, where the radius R is equal to 216 mm, where the thickness E of each strip is equal to 0.5 mm and where the width L of each strip is equal to 130 mm, the table III below is created using the table I described above. More specifically, columns 3 and 4 of table III are deduced from the above considerations, whereas the other columns are taken from table I presented above.

TABLE III

| Pretension $T_0$ | Number n of layers of Kevlar ® | $\sigma 0 = T0/(L \times E)$ | $(n \sigma 0 E)/(R \, P_{ext}) = (n T_0)/(R \, L \, P_{ext}) \approx P_0/P_{ext}$ | Pretension as a % of the resistance of the strips | Maximum tension undergone in service by each strip |
|---|---|---|---|---|---|
| 20 daN | 8 | 3 MPa | 0.2% | 0.2% | 2000 daN |
| 260 daN | 7 | 40 MPa | 2.1% | 3% | 2000 daN |
| 650 daN | 6 | 100 MPa | 4.6% | 7.5% | 2000 daN |
| 1170 daN | 5 | 180 MPa | 6.9% | 13.6% | 2000 daN |
| 2000 daN | 4 | 308 MPa | 9.5% | 23.2% | 2000 daN |
| 3400 daN | 3 | 523 MPa | 12% | 39.5% | 3400 daN |

The first line corresponds also to the situation according to the prior art. The fifth column shows, from the third line, the cases where $P_0$ is greater than 4% of the maximum hydrostatic pressure of the sea bed $P_{ext}$, whereas the sixth column shows, from the third line, the cases where the tension stress $\sigma_0$ is greater than 5% of the elastic limit $\sigma_E$.

Thus, it will be observed that the choice of one or other of the criteria for selecting the number of anti-inflation strips and their longitudinal laying tension $T_0$, leads to adopting similar conditions for manufacture of the flexible tubular pipe.

Also, the present invention equally relates to the flexible tubular pipes that exhibit the abovementioned features.

The invention claimed is:

1. A method for manufacturing a flexible tubular underwater pipe intended to transport hydrocarbons, the method comprising:
    providing a leakproof tubular structure covered with at least one layer of armor wires wound in a first helix with a long pitch around said tubular structure wherein said armor wires are able to take up axial forces on said pipe when said tubular structure is stretched axially;
    winding at least one continuous longitudinal element made of a deformable material in a second helix with short pitch around said layer of armor wires to form a holding layer capable of taking up radial forces of said armor wires when said tubular structure contracts axially; and
    stretching said at least one continuous longitudinal element in said second helix during said winding under a longitudinal tension $T_0$ to stretch and deform said deformable material to elongate the continuous longitudinal element under a tensile stress $\sigma_0$ less than an elastic limit value $\sigma_E$ of said deformable material, wherein said elastic limit value $\sigma_E$ corresponds to a tensile stress beyond which the deformation of said deformable material is irreversible, and
    wherein $\sigma_0$ is at least 3% of $\sigma_E$.

2. The method for manufacturing a flexible tubular pipe as claimed in claim 1, further comprising stretching said deformable material according to a said relative elongation corresponding to a tensile stress σ0 between said elastic limit value σE and a twentieth of said elastic limit value σE.

3. The method for manufacturing a flexible tubular pipe as claimed in claim 1, further comprising forming a leakproof outer sheath around said holding layer.

4. The method for manufacturing a flexible tubular pipe as claimed in claim 1, further comprising said winding is of a plurality of said continuous longitudinal elements to form said holding layer.

5. The method for manufacturing a flexible tubular pipe as claimed in claim 1, wherein said at least one continuous longitudinal element is formed in a strip.

6. The method for manufacturing a flexible tubular pipe as claimed in claim 1, further comprising providing a leakproof tubular structure inward of said at least one armor layer and having a diameter greater than 250 millimeters.

7. The method for manufacturing a flexible tubular pipe as claimed in claim 1, wherein said armor wires have a thickness less than 6 millimeters.

8. The method for manufacturing a flexible tubular pipe as claimed in claim 1, wherein said armor wires are wound in a helix with a long pitch according to an armoring angle greater than 20°.

9. A flexible tubular underwater pipe manufactured as claimed in claim 1, wherein said tensile stress σ0 of said deformable material is between said elastic limit value σE and a twentieth of said elastic limit value σE.

10. The method for manufacturing a flexible tubular pipe as claimed in claim 1, wherein $\sigma_0$ is at most 39.5% of $\sigma_E$.

11. The method for manufacturing a flexible tubular pipe as claimed in claim 1, further comprising providing a plurality of layers n of said continuous longitudinal elements,
    wherein n and $T_0$ satisfy $nT_0 > 0.04$ RLPext, wherein Pext is a maximum pressure received by said pipe at a seabed, L is a width of a longitudinal element, and R is a radius of an innermost layer of said plurality of layers.

12. A flexible tubular underwater pipe intended to transport hydrocarbons, comprising:

a leakproof tubular structure, covered with at least one layer of armor wires wound in a first helix with a long pitch around said tubular structure wherein said armor wires are able to take up axial forces on said pipe when said tubular structure is stretched axially;

at least one continuous longitudinal element made of a deformable material wound in a second helix with short pitch around said layer of armor wires to form a holding layer capable of taking up radial forces of said armor wires when said tubular structure contracts axially; and wherein said deformable material of said at least one longitudinal element is stretched and under a longitudinal tension $T_0$ according to a relative elongation corresponding to a tensile stress $\sigma_0$ less than an elastic limit value $\sigma_E$ of said deformable material, wherein said elastic limit value $\sigma_E$ corresponds to a tensile stress beyond which the deformation of said deformable material is irreversible, and wherein $\sigma_0$ is at least 3% of $\sigma_E$.

13. The flexible tubular underwater pipe of claim 12, wherein $\sigma_0$ is at most 39.5% of $\sigma_E$.

* * * * *